(12) United States Patent
Michioka et al.

(10) Patent No.: US 6,389,673 B1
(45) Date of Patent: May 21, 2002

(54) METHOD OF MANUFACTURING A CURVILINEAR GUIDE RAIL AND CURVILINEAR GUIDE RAIL

(75) Inventors: Hidekazu Michioka; Masashi Konomoto, both of Tokyo (JP)

(73) Assignee: THK Co., Ltd., Tokyo (JP)

( * ) Notice: Subject to any disclaimer, the term of this patent is extended or adjusted under 35 U.S.C. 154(b) by 0 days.

(21) Appl. No.: 09/444,913

(22) Filed: Nov. 24, 1999

(30) Foreign Application Priority Data

Nov. 27, 1998 (JP) .......................................... 10-336821

(51) Int. Cl.[7] .............................................. B23P 11/00
(52) U.S. Cl. .......................................... 29/450; 29/446
(58) Field of Search ..................... 29/446, 450, 898.03, 29/897.2

(56) References Cited

U.S. PATENT DOCUMENTS

| | | | | |
|---|---|---|---|---|
| 3,156,034 A | * | 11/1964 | Gruetjen | 29/897.2 |
| 3,388,446 A | * | 6/1968 | Phillips | 29/897.2 |
| 4,619,683 A | | 10/1986 | Halberschmidt et al. | 65/351 |
| 4,855,678 A | * | 8/1989 | Kreiskorte | 324/262 |
| 5,239,753 A | * | 8/1993 | Kalis, Jr. et al. | 29/897.2 |

FOREIGN PATENT DOCUMENTS

| | | | | |
|---|---|---|---|---|
| JP | 358141813 | * | 8/1983 | B21D/7/06 |
| JP | 10-122238 | | 5/1998 | |
| JP | 11190334 | * | 7/1999 | F16C/29/02 |

OTHER PUBLICATIONS

Machine Translation of JP 11–190334 from JPO website.

* cited by examiner

Primary Examiner—S. Thomas Hughes
Assistant Examiner—Essama Omgba
(74) Attorney, Agent, or Firm—Morgan, Lewis & Bockius, LLP

(57) ABSTRACT

In a method for manufacturing a curvilinear guide rail for guiding a moving body along a curved line having a given curvature, the bottom surface of a linear guide rail for guiding a moving body in a linear manner is pressed against a curved rail mounting surface formed with a given radius of curvature to thereby elastically deform the linear guide rail in a curvilinear manner, and the linear guide rail is then fixed to the rail mounting surface while the linear guide rail remains deformed elastically, thereby producing a curvilinear guide rail.

3 Claims, 4 Drawing Sheets

METHOD OF MANUFACTURING A CURVILINEAR GUIDE RAIL AND CURVILINEAR GUIDE RAIL

BACKGROUND OF THE INVENTION

1. Field of the Invention

The present invention relates to a method of manufacturing a curvilinear guide rail for guiding a moving body along a curve having a given curvature in a curvilinear guide device for use in a vibration isolating apparatus applied to a precision instrument, a fine art showcase or the like, and a curvilinear guide rail manufactured according to the present method.

2. Description of the Related Art

Conventionally, as an earthquake measure for real estate such as a building or a house, or as a vibration measure when conveying a precision instrument, a fine art showcase or the like, there has been used a vibration isolating apparatus which absorbs the vibrations of the ground or a floor to relieve the shaking motion thereof. As the vibration isolating apparatus, there has been known an apparatus employing a curvilinear guide device that guides a moving body in a curvilinear manner along a curvilinear guide rail (refer to, for example, Japanese Patent Unexamined Publication No. Hei 10-122238).

FIG. 4 shows a specific example of a vibration isolating apparatus 100 with a curvilinear guide device. The vibration isolating apparatus 100 includes a first curvilinear guide device 60 fixed to a floor 50, a second curvilinear guide device 70 fixed to a supported body 51 such as a precision instrument from which vibrations are to be isolated by the apparatus 100, and a universal coupling 80 that connects those two curvilinear guide devices 60 and 70 to each other. The first and second curvilinear guide devices 60 and 70 are so disposed as to meet each other at right angles.

Also, those two curvilinear guide devices 60 and 70 respectively include curvilinear guide rails 61 and 71 respectively formed in a curved manner with their respective given curvatures, and moving bodies 62 and 72 respectively movable along their associated curvilinear guide rails 61 and 71. The universal coupling 80 connects the moving bodies 62 and 72 of the first and second curvilinear guide devices 60 and 70 to each other. The two curvilinear guide devices 60 and 70 are previously formed by bending with their respective curvatures so as not to be fixed directly to the floor which provides a plane. Therefore, they are respectively fixed to the floor 50 and supported body 51 through their associated fixing bases 63 and 73 which are formed in curved shapes respectively having the same curvatures as those of the curvilinear guide rails 61 and 71. In this specification, the term "bending" means "bending involved with plastic deformation", that is, means that, after the rail is once formed by bending, the rail can never be naturally restored to its original shape.

FIG. 5 is a schematic view of the above-structured vibration isolating apparatus, showing a specific method for using the same. Referring to FIG. 5, reference numeral 50 designates a floor (floor surface) and 51 stands for a supported body such as a fine art showcase. Four vibration isolating apparatuses 100 of the above-mentioned type are respectively disposed at four positions between the floor 50 and supported body 51 in such a manner as to support the supported body 51. Thanks to this arrangement, if the floor 50 is caused to shake due to an earthquake or the like, the moving bodies 62 and 72 of the first and second curvilinear guide devices 60 and 70 move on their respective curvilinear guide rails 61 and 71 in such a manner as to absorb such shaking motion of the floor 50, thereby preventing the vibrations of the floor 50 from being propagated to the supported body 51.

However, the above-mentioned conventional curvilinear guide device suffers from the following problem. That is, a guide rail, which has been formed by drawing in such a manner as to have a given sectional shape and still remains in a linear shape, is subjected to bending, thereby producing a curvilinear guide rail. Further, in this bending operation, it is necessary to bend the guide rail with a given curvature. As a result, it takes time and labor to produce the curvilinear guide rail.

Also, when forming a ball rolling surface on a curvilinear guide rail, because the ball rolling surface cannot be formed by grinding on the curvilinear guide rail after the curvilinear guide rail has been bent, such grinding operation is executed prior to the bending operation. In addition, since the hardness of the ball rolling surface must be enhanced, it is necessary to carry out heat treatment such as cementation hardening the surface of the guide rail before the grinding operation. However, when stainless steel is used as the forming material of the guide rail in order to meet the requirements such as anticorrosion, the hardening treatment hardens not only the surface of the guide rail but also the center portion thereof. As a result, if the guide rail is bent beyond the elastically deformable limit thereof, then there arises such a problem that there occurs a crack in the curvilinear guide rail produced by such bending.

SUMMARY OF THE INVENTION

The present invention has been made to eliminate the drawbacks with the above-conventional curvilinear guide rail, and therefore an object of the invention is to provide a method of manufacturing a curvilinear guide rail which, when manufacturing a curvilinear guide rail of a curvilinear guide device for guiding a moving body along a curved line having a given curvature, can manufacture the curvilinear guide rail without taking time and labor and at a low cost.

Also, another object of the invention is to provide a curvilinear guide rail which can be manufactured without taking time and labor and at a low cost.

To achieve the above objects, according to one aspect of the invention, there is provided a method for manufacturing a curvilinear guide rail for guiding a moving body along a curved line having a given curvature, the method comprising the steps of: preparing a linear guide rail for guiding a moving body in a linear manner; pressing a bottom surface of said linear guide rail against a curved rail mounting surface of a fixing base formed with a given radius of curvature to elastically deform the linear guide rail in a curvilinear manner; and fixing the linear guide rail to the rail mounting surface while the linear guide rail remains deformed elastically, to produce a curvilinear guide rail.

According to another aspect of the invention, there is provided a curvilinear guide rail for guiding a moving body along a curved line having a given curvature, the curvilinear guide rail comprising: a rail fixing base having a curved rail mounting surface formed with a given radius of curvature; a rail main body formed in a linear shape and elastically deformable in a curvilinear manner when it is pressed against the rail mounting surface of the rail fixing base; and rail fixing means for fixing the rail main body to the rail mounting surface.

In the the invention, the bottom surface of the linear guide rail is pressed against the rail mounting surface formed in a curved shape, and the linear guide rail is fixed to the rail mounting surface while the linear guide rail remains deformed within its elastically deformable range, thereby manufacturing a curvilinear guide rail for moving a moving body along a curved line having a given curvature. Thanks to this, not only a bending operation taking time and labor can be omitted, but also a curvilinear guide rail can be manufactured easily using a currently existing linear guide rail which can be obtained easily on the market, which makes it possible to manufacture a curvilinear guide rail having a given curvature at low costs.

Also, in the present invention, it is necessary to provide a rail fixing base against which the bottom surface of a linear guide rail is pressed. Similarly, even in the conventional curvilinear guide rail, when it is fixed to a floor or the like, it is necessary to use a rail fixing base having a curved rail mounting surface. However, according to the invention, the number of parts necessary for fixation of the rail is not increased over that in the conventional guide rail, but a curvilinear guide rail can be manufactured at the costs which are lowered by an amount equivalent to the elimination of the bending operation.

Further, in the invention, since the linear guide rail pressed against the bottom surface of the rail mounting surface is simply deformed within its elastically deformable range, even if it is fixed to the rail mounting surface in the deformed state, there is no fear that there can occur any crack in the linear guide rail thus fixed, and therefore, even when a curvilinear guide rail is manufactured using such material that can be cracked by a bending operation involved with plastic deformation, the present manufacturing method is surely able to cope with this problem, that is, eliminate the fear of any crack occurring in the guide rail.

Therefore, the present invention is effective in the manufacture of a curvilinear guide by using such material that is difficult to bend after it is hardened.

Also, as the rail fixing means for fixing a linear guide rail, which has been pressed against the curved rail mounting surface and elastically deformed in a curved manner, to the rail mounting surface while the linear guide rail remains elastically deformed, there can be used. any fixing means, provided that it is able to hold the linear guide rail on the rail mounting surface against the elastic force of the linear guide rail that is going to restore the linear guide rail back to its original shape. For example, a fixing bolt may be inserted through the linear guide rail and threadedly engaged with the rail mounting surface.

DETAILED DESCRIPTION OF THE PREFERRED EMBODIMENTS

Now, description will be given below in detail of a method for manufacturing a curvilinear guide rail according to the invention with reference to the accompanying drawings.

Figure 1:
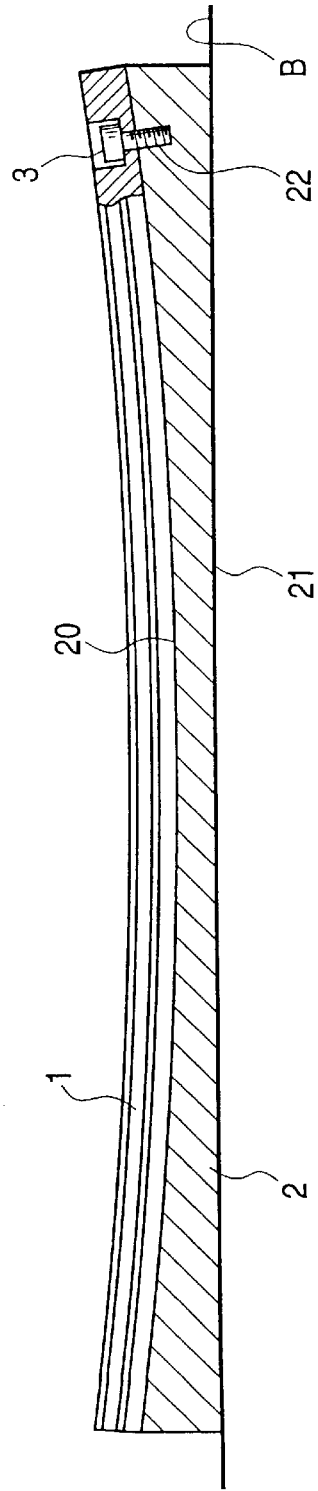
FIG. 1 is a front view of a linear guide rail obtained by a method for manufacturing a curvilinear guide rail according to the invention.

FIG. 1 shows a curvilinear guide rail manufactured through a method of manufacturing a curvilinear guide rail according to the invention. In FIG. 1, reference numeral 1 designates a rail main body, 2 stands for a rail fixing base for mounting the rail main body 1 onto a fixed surface B such as the surface of a floor or the surface of a supported body, and 3 represents a fixing bolt serving as rail fixing means which can be inserted through the rail main body 1 and threadedly engaged with the rail fixing base 2.

Figure 2:
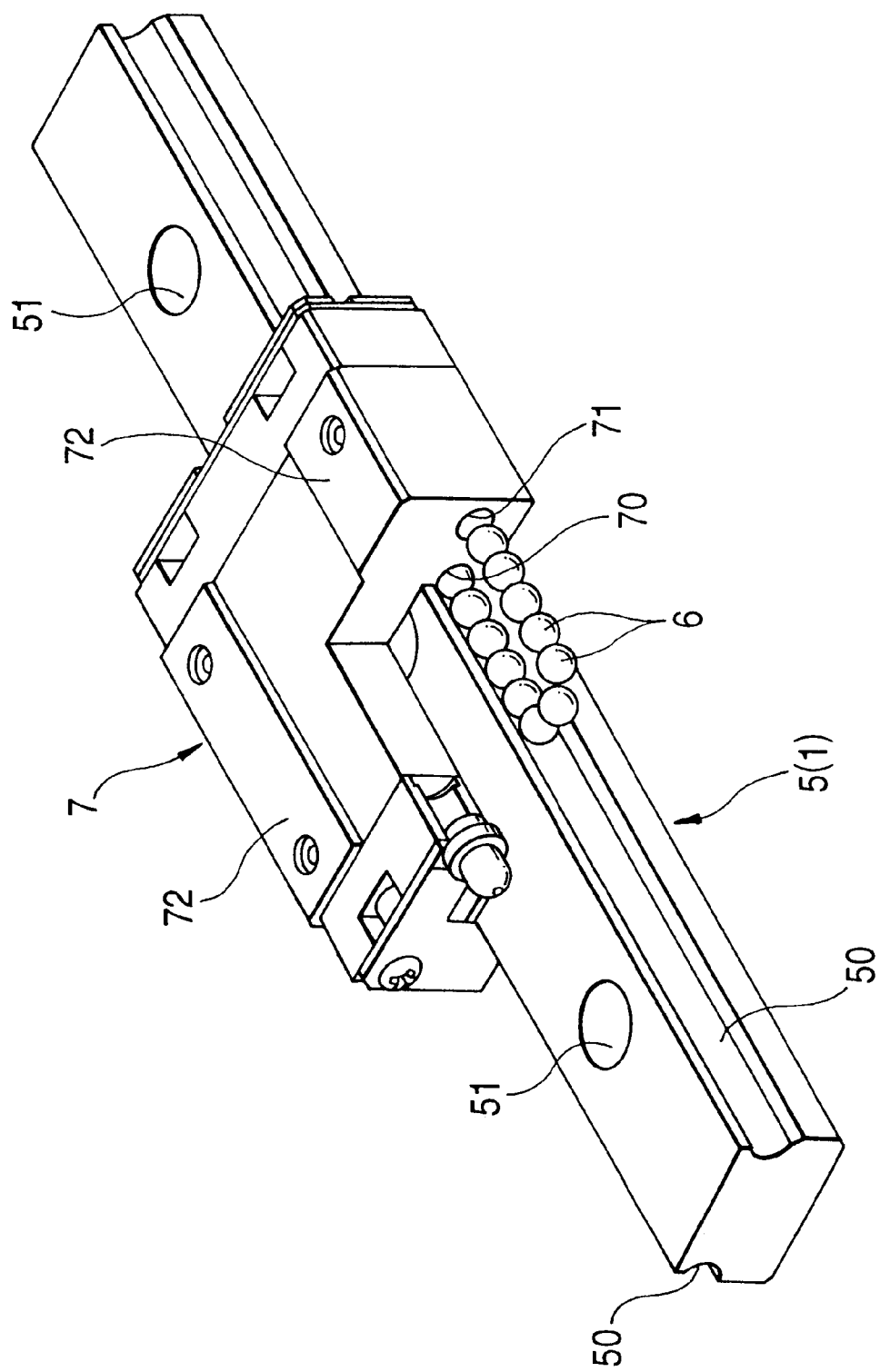
FIG. 2 is a perspective view of a linear guide device used in enforcing a method for manufacturing a curvilinear guide rail according to the invention.
Figure 4:
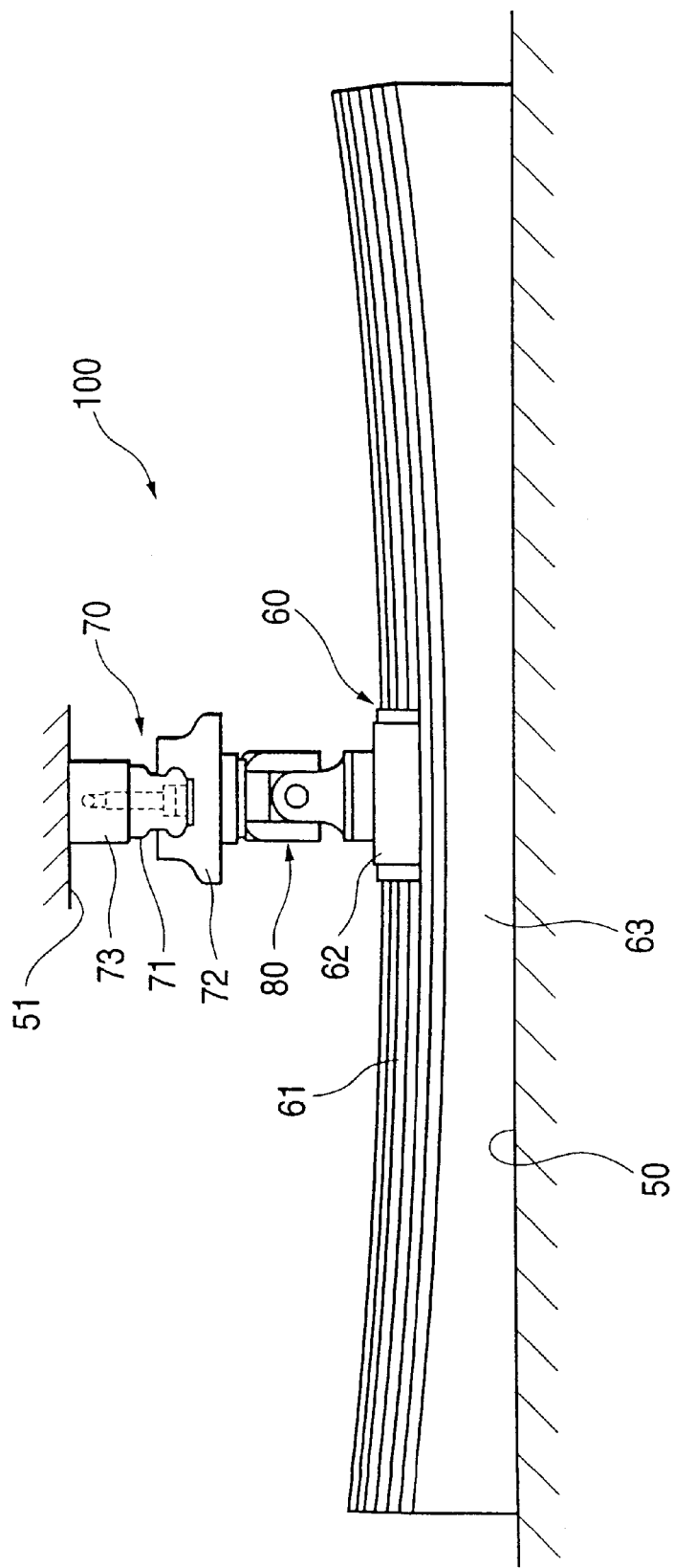
FIG. 4 is a front view of an example of a vibration isolating apparatus using a curvilinear guide device.
Figure 5:
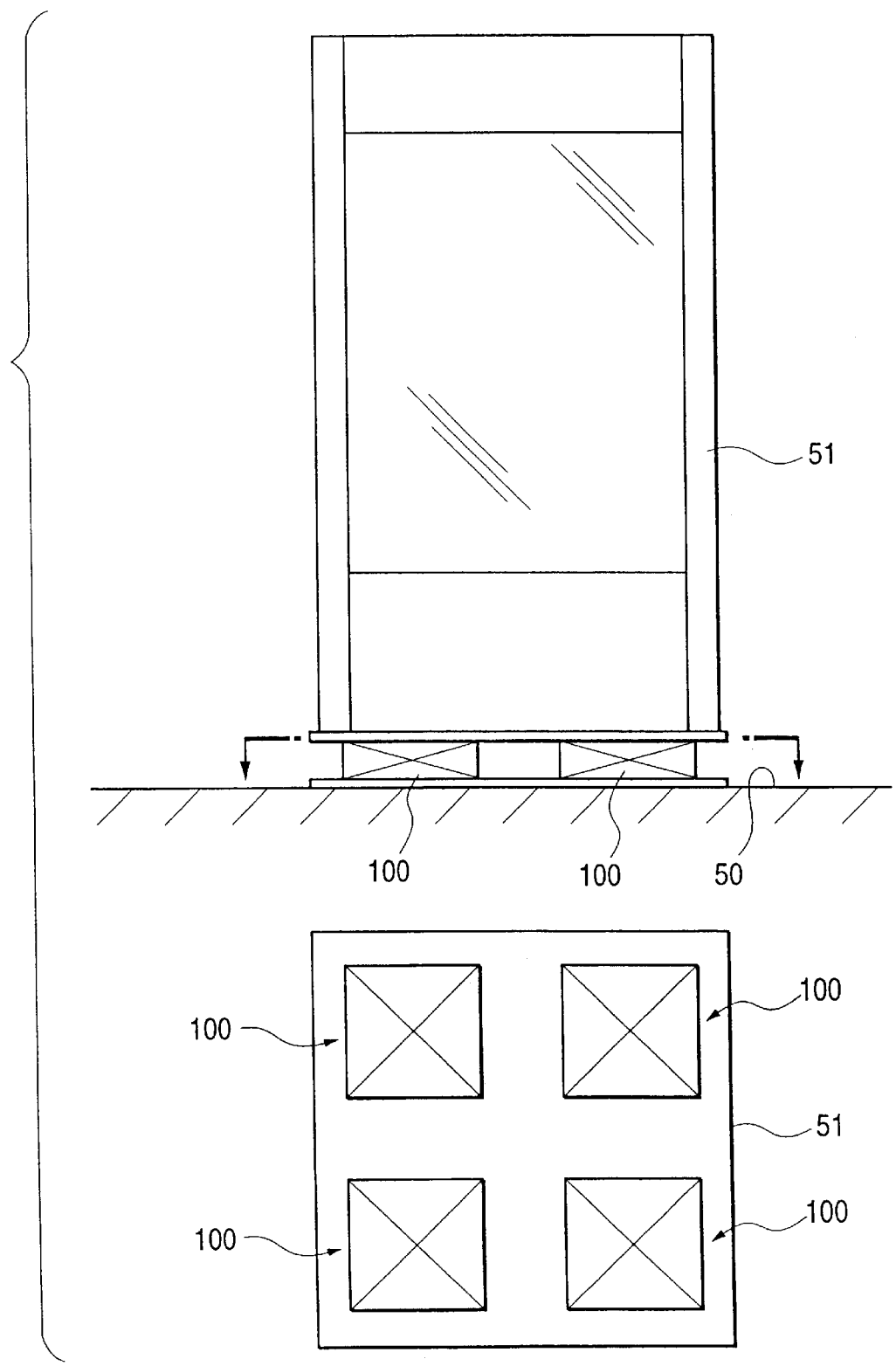
FIG. 5 is an explanatory view of a using example of the vibration isolating apparatus shown in FIG. 4.

A track rail (a linear guide rail) 5 shown in FIG. 2 as it is is used as the rail main body 1. As shown in FIG. 2, the linear guide device includes the track rail 5 which is formed in a linear shape and has two strips of ball rolling surfaces 50 respectively formed along the longitudinal direction thereof, and a moving body 7 which is formed in a saddle-like shape sitting astride of the track rail 5 and can be engaged through balls 6 with the track rail 5 to be thereby freely slidable along the track rail 5 in the longitudinal direction. The moving body 7 includes not only a load ball rolling surface 70 which cooperates with the ball rolling surface 50 of the track rail 5 to embrace the balls 6 between them but also an endless circulation passage 71 along which the balls 6 having rolled along the load ball rolling surface 70 can be circulated. With the above structure of the linear guide device, as the moving body 7 moves along the track rail 5, the balls 6 are allowed to circulate within the endless circulation passage 71. The moving body 7 also includes a mounting surface 72 for mounting a movable member thereon, and in the vibration isolating apparatus shown in FIG. 4, the universal coupling 80 is fixed onto the mounting surface 72. In FIG. 2, reference numeral 51 designates a bolt mounting hole through which the fixing bolt 3 for fixing the track rail 5 to the rail fixing base 2 can be inserted.

On the other hand, the rail fixing base 2 includes not only a rail mounting surface 20 formed in a curved shape having a given curvature (for example, 4–6 m) but also a plane-shaped bottom surface 21 to be contacted with the above-mentioned fixed surface B, while the rail fixing base 2 also functions as a bracket for mounting the rail main body 1 onto the fixed surface B. Also, in the rail mounting surface 20, there is opened up a tap hole 22 into which the fixing bolt 3 can be threadedly engaged. The tap hole 22 is formed along the bottom surface 21 of the rail fixing base 2 at the same pitch as that of the bolt mounting hole 51 of the track rail 5.

Figure 3:
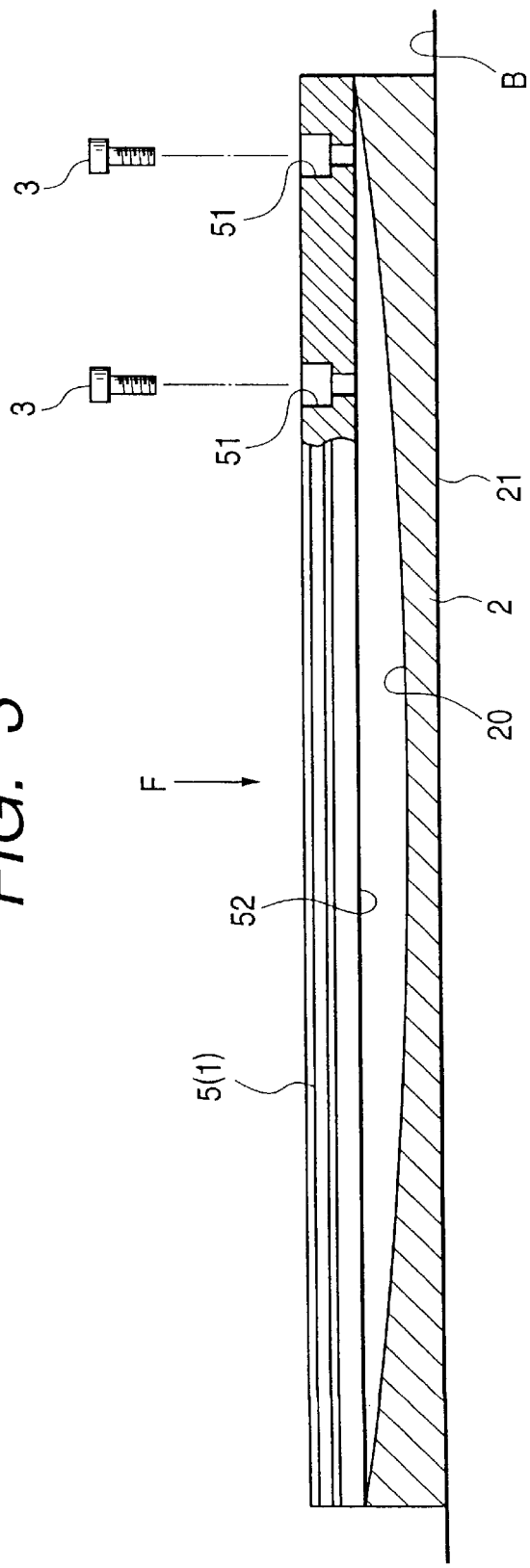
FIG. 3 is an explanatory view to show part of a procedure for enforcing a method for manufacturing a curvilinear guide rail according to the invention.

FIG. 3 shows a procedure for fixing the linear-shaped track rail 5 to the rail fixing base 2 to produce a curvilinear guide rail. Specifically, the track rail 5 of the linear guide device, with the ball rolling surface 50 and bolt mounting holes 51 already formed therein, is placed on the rail mounting surface of the rail fixing base 2, a load F is applied from above the track rail 5 to press the bottom surface 52 of the track rail 5 against the rail mounting surface 20 and thus deform the track rail 5 elastically, and the fixing bolts 3 respectively inserted through their associated bolt mounting holes 51 are sequentially threadedly engaged into their associated tap holes 22 of the rail fixing base 2. As a result, the track rail 5 is elastically deformed with a curvature identical with the curvature of the rail mounting surface 20 and then fixed to the rail fixing base 2 while maintaining its elastically deformed state, to thereby provide the above-mentioned rail main body 1 (see FIG. 1). Since the track rail 5 is simply deformed in a curvilinear manner within its elastically deformable range, even after the track rail 5 has been once fixed to the rail mounting surface 20 by the fixing bolts 3, if the fixing bolts 3 are removed, then the track rail 5 is allowed to restore its shape back to its original linear shape due to its own elastic force.

Since the tap holes 22 are formed so as to extend not along the rail mounting surface 20 but along the bottom surface 21 of the rail fixing base 2 at the same pitch as that of the bolt mounting holes 51 of the track rail 5, there may be a fear that the bolt mounting holes 51 of the track rail 5 cannot be matched to the tap holes 22 of the rail mounting surface 20 in a state where the track rail 5 is elastically deformed in a curved manner. However, normally, the inner diameter of each bolt mounting hole 51 is formed larger than the nominal diameter of each tap hole 22 and in the case where the curvature of the rail mounting surface 20 is small, even if the track rail 5 is elastically deformed in a curved manner, there is no possibility that the bolt mounting hole 51 and tap hole 22 can be greatly displaced from each other. Therefore, the fixing bolts 3. respectively having been inserted through the bolt mounting holes 51 can be threadedly engaged into the tap holes 22 with ease. Also, when the curvature of the rail mounting surface 20 is large, if the bolt mounting holes 51 of the track rail 5 are respectively worked into elongated holes, then the fixing bolts 3 respectively having been inserted through the bolt mounting holes 51 can be threadedly engaged into the tap holes 22 with ease regardless of the degree of the elastic deformation of the track rail 5.

As described above, in the curvilinear guide rail according to this embodiment, since the track rail 5 of the linear guide device as it is is pressed against and fixed to the rail mounting surface 20 of the rail fixing base 2 to form a curvilinear guide rail having a curvature identical with the curvature of the rail mounting surface 20, there is eliminated the necessity to execute bending operation on the track rail 5 involved with plastic deformation, with the result that even if the material of the track rail 5 is difficult to bend, there is no fear that there can occur a crack in the track rail 5. Also, because a curvilinear guide rail having a curvature identical with the curvature of the rail mounting surface 20 is obtained by simply fixing the track rail 5 to the rail mounting surface 20, the bending operation of the track rail 5 can be carried out with no need to measure the curvature thereof in detail, so that a curvilinear guide rail can be manufactured very simply.

When the curvature of the rail main body 1 fixed to the rail fixing base 2 is small, the moving base 7 of the linear guide device can be used as it is, as the moving base which moves along the curvilinear guide rail thus manufactured with no need to execute any additional working operation on the moving base 7 of the linear guide device. On the other hand, when the curvature of the rail main body 1 is large, if a curvature is given to the load ball rolling surface 70 of the moving base 7 as well according to the curvature of the rail main body 1, then the movement of the moving body 7 on the rail main body 1 can be made smooth.

As described above, the fixing bolt 3 is used as the rail fixing means in the above embodiment, it may be replaced by well-known adhesion, welding and so on.

As has been described heretofore, with use of a method for manufacturing a curvilinear guide rail according to the invention, with fixation of a linear guide rail to a rail mounting surface formed in a curved surface having a given curvature in such a manner that the linear guide rail is elastically deformed, a curvilinear guide rail having a given curvature can be manufactured without bending the linear guide rail. Thanks to this, not only time and labor necessary for execution of the otherwise required bending operation can be omitted, but also a curvilinear guide rail can be manufactured simply regardless of the material of the rail, so that a curvilinear guide rail having a given curvature can be manufactured at low costs.

What is claimed is:

1. A method of manufacturing a curvilinear guide rail for guiding a moving body along a curved line having a given curvature, said method comprising the steps of:

pressing a bottom surface of a linear guide rail for guiding the moving body in a linear manner against a curved rail mounting surface of a rail fixing base which is formed with a given radius of curvature to elastically deform said linear guide rail in a curvilinear manner; and fixing said linear guide rail to said rail mounting surface while said linear guide rail remains deformed elastically to produce a curvilinear guide rail.

2. The method for manufacturing as claimed in claim 1, wherein said linear guide rail is made of stainless steel material.

3. The method of manufacturing as claimed in claim 1, wherein in the fixing step, a fixing means forcedly holds the linear guide rail on the rail mounting surface against the elastic force of the linear guide rail that is going to restore the linear guide rail back to its original shape.

* * * * *